United States Patent [19]

Sternberger

[11] Patent Number: 4,788,656

[45] Date of Patent: Nov. 29, 1988

[54] CACHE MEMORY AND PRE-PROCESSOR

[75] Inventor: Wayne I. Sternberger, Columbia, Md.

[73] Assignee: The Johns Hopkins University, Baltimore, Md.

[21] Appl. No.: 614,226

[22] Filed: May 25, 1984

[51] Int. Cl.[4] ............................................. G06F 7/00
[52] U.S. Cl. .................................................. 364/900
[58] Field of Search .............................. 364/200, 900

[56] References Cited

U.S. PATENT DOCUMENTS

| | | | |
|---|---|---|---|
| 4,309,754 | 1/1982 | Dinwiddie, Jr. ............... | 364/200 |
| 4,462,073 | 7/1984 | Grondalski ..................... | 364/200 |
| 4,481,572 | 11/1984 | Ochsner ......................... | 364/200 |

Primary Examiner—Salvatore Cangialosi
Attorney, Agent, or Firm—Robert E. Archibald; Howard W. Califano

[57] ABSTRACT

The invention relates to an apparatus for interfacing between a peripheral device and a host processor. The invented cache memory and pre-processor operates in either an acquisition mode, where it appears to be a memory dedicated to the peripheral, or in a retrieval mode, where it appears to be a memory dedicated to the host microprocessor. For example, the cache memory can be reconfigured from a 2K byte by 16-bit space during the acquisition mode to a 4K byte × 8-bit space during the retrieval mode, wherein the high and low bytes of the previously defined 16-bit words are interleaved.

13 Claims, 2 Drawing Sheets

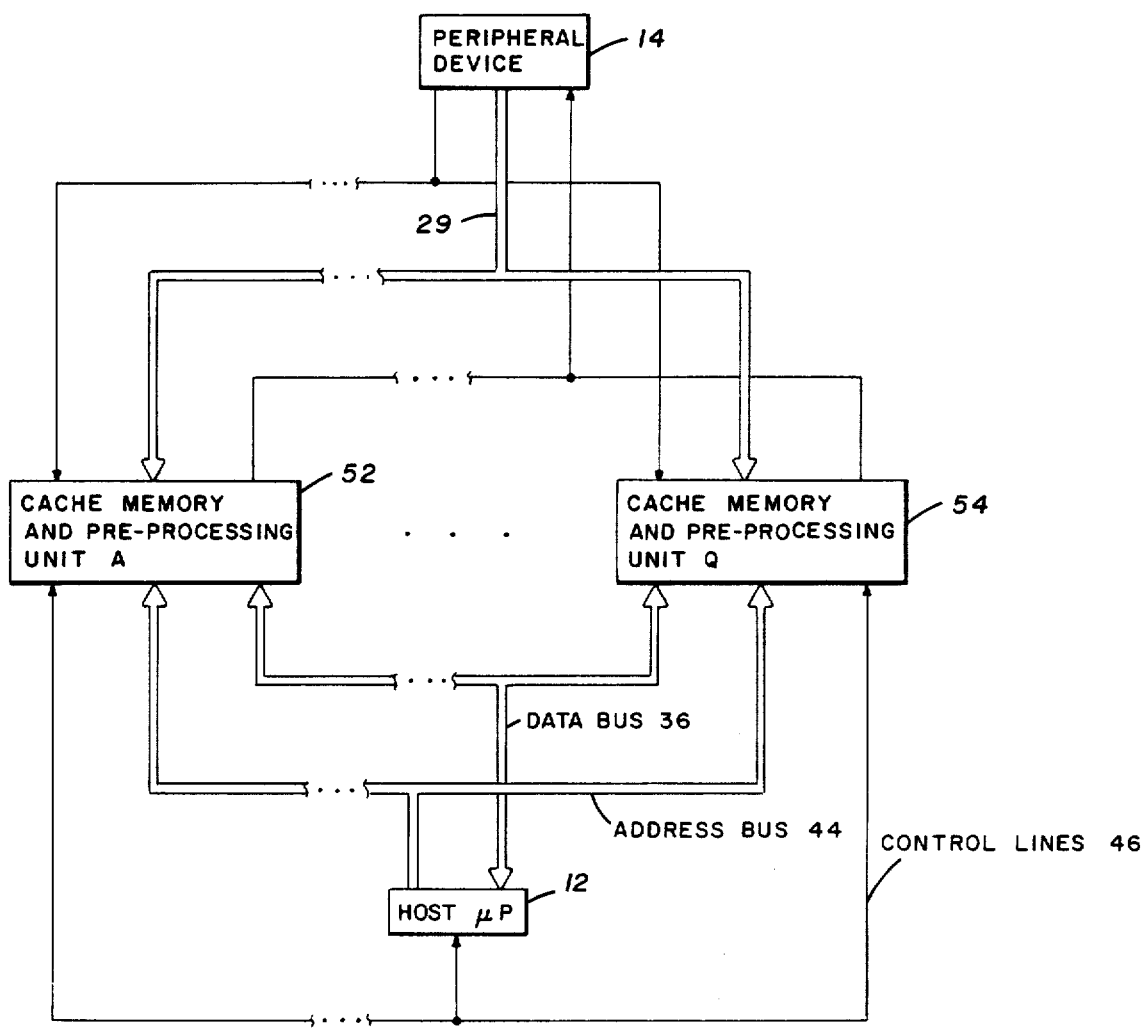

CACHE MEMORY AND PRE-PROCESSOR

STATEMENT OF GOVERNMENTAL INTEREST

The Government has rights in this invention pursuant to Contract No. N00024-83-C-5301 awarded by the Department of the Navy.

BACKGROUND OF THE INVENTION

1. Field of the Invention

This invention relates to an apparatus for interfacing between a peripheral device and a host processor. The invented cache memory and pre-processor operates in either an acquisition mode, where it appears to be a memory dedicated to the peripheral, or in a retrieval mode, where it appears to be a memory dedicated to the host processor.

2. Description of the Prior Art

Certain peripheral devices, such as a laser doppler velocimeter, generate data which are not time continuous, and the regularity of the occurrence of new data are not known a priori. Certain peripheral devices of this nature can generate an average data rate in $10^\circ$ sec$^{-1}$ to $10^4$ sec$^{-1}$ range, with intermittent data burst as high $10^6$ sec$^{-1}$. However, the host processor which acquires the data and calculates mean and standard deviation values, can be throughput limited to approximately $3 \times 10^3$ samples per second, given an interrupt driven routine dedicated to servicing the peripheral and storing data in sequential memory locations. It is therefore obvious that there is a general incompatability between the peripheral device and the memory mapped host processor system, with the result being lost data. Certain prior art systems have attempted to resolve these incompatabilities. Certain systems used a buffer and processor combination; however, such systems must acquire data and perform calculations one data element at a time. These calculations are made in real time, as the data is being produced, and since the software calculations are slow, data can be lost. Alternatively, the peripheral host processor can address a dual port RAM. However, a dual port RAM would not be useful if 16-bit words were acquired from the peripheral and only 8-bit words could be read by the host processor's data bus.

SUMMARY OF THE INVENTION

The present invention overcomes the interface problems associated with the prior art devices and provides an interface between a memory mapped host processor system and a parallel output peripheral. The peripheral may generate data in a 16-bit floating point format with 4 bits for the exponent and 12 bits for the mantissa. The invention can be designed to handle a peripheral generating an average data rate in the $10^\circ$ sec$^1$ to $10^4$ sec$^{-1}$ range, with intermittent data bursts as high as $10^6$ sec$^{-1}$ with no lost data.

The invented cache memory and pre-processor can be switched from an acquisition mode to a retrieval mode under software control by the host processor. In the acquisition mode the cache memory appears to be a memory space dedicated to the peripheral; and, in the retrieval mode the cache memory appears to be a memory space dedicated to the host processor. As the cache memory is switched from the acquisition to the retrieval mode, its memory space is automatically reconfigured. For example, in the acquisition mode the RAM memory space can be configured to a 2K byte by 16-bit block of memory; and, in the retrieval mode the memory is a configurated as a 4K byte by 8-bit block of memory. The high and low bytes of the previously defined 16-bit words are interleaved. In other words, two successive bytes of memory constitute the 16 bits of memory for one unique data point.

The present invention also provides an efficient hardware augmentation for calculating mean and standard deviation values. The invention includes a hardware pre-processor which reduces calculation time. If the data from the peripheral is in the floating point format, calculating the mean and standard deviation value requires normalization of the data. For prior art devices which merely use a buffer memory under software control, the data must be retrieved from the memory three times and the data normalized twice in order for mean and standard deviation calculation to be made. In the present invention, hardware pre-processing occurs which allows the mean and standard deviation to be calculated with the host processor only having to retrieve the data twice and normalize the data once. The present invention teaches the use of a maximum exponential value pre-processor which determines the maximum exponential value in real time. This value can be retrieved by the host processor and can be used to normalize data stored in the cache memory. Since the cache memory, during the retrieval mode, appears to be dedicated to the host processor, the host processor can read the raw data from the RAM memory, normalize the data, and rewrite newly normalized data into the RAM memory. The present invention is thus uniquely suited to interface between a peripheral device which generates non-time continuous data in 16-bit floating point format, and, interface such acquired data to a memory mapped host processor having an 8-bit data bus. The invention is also specifically suited to enable the host processor to calculate mean and standard deviation values based upon initial pre-processing provided by the invented cache memory and pre-processor.

The invented apparatus generaly comprises: (1) a plurality of memories each memory having a M byte by N bit memory space; a first bus transceiver means for connecting N bit portions of said data word to each of said plurality of memories during the acquisition mode; a second bus transceiver means, for connecting the data lines of each of said plurality of memories to the host processors N bit data bus during the retrieval mode; an address means, for generating an address for each data word acquired from the peripheral; an address multiplexing means for connecting the address lines of each of said plurality of memories to said address means during the acquisition mode and for connecting the address lines of each of said plurality of memories to certain most significant bits of the host processor address bus during the retrieval mode; a selector means, operably connected to each of said plurality of memories, for alternatively enabling each of said plurality of memories in response to certain least significant bits in the host processor's data bus in the retrieval mode; and, a maximum value means operably coupled to said first and second bus transceiver means, for comparing during the acquisition mode, exponent values appearing in each data word and storing the largest exponent value, and wherein said stored largest exponent value can be read by the host processor during the retrieval mode. It will be noted that the invented apparatus can be configured to accommodate a peripheral device having a Q bit output and a host processor having an N bit data bus. For example, the peripheral device may generate a 32-bit floating point data output word and the host processor may have an 16-bit data bus.

Therefore, a first novel feature of the invention is the use of parallel memory space alternatively reconfigured, under software control between (a) an acquisition mode where the cache memory is capable of acquiring from the peripheral a Q bit data word; and, (b) a retrieval mode where the cache memory is configured so that a processor having an N bit data bus can easily retrieve the stored data. For example, in the acquisition mode the cache memory can be configured as a 2K byte by 16-bit block of static RAM memory capable of acquiring a 16-bit input data word; and, in the retrieval mode, the cache memory can be configured as a 4K byte by 8-bit block of memory so that a double byte access command from an 8-bit processor can effectively retrieve the acquired data. In this invention, the high and low bytes of the previously defined 16-bit words are interleaved. In other words, two successive bytes of memory constitute the 16 bits of memory for one unique data point.

A second novel feature of the invented apparatus is the use of a hardware circuit to determine the maximum exponent value of the acquired data. This feature is used to conserve software computer processing time.

A third feature of the invented apparatus is that the sampling size of the cache memory can be adjusted under software control. The host processor can program a sampling size control means to limit the sampling to a maximum value. A hardware circuit automatically provides an interrupt signal when the memory space has acquired the programmed number of data words.

A fourth novel feature of the present invention is that cache memory and pre-processor units can be assembled in a ping-pong embodiment. In this embodiment one unit alternatively acquires data while the other unit is in the retrieval mode. This ping-pong configuration eliminates the possiblity of lost data.

A fifth novel feature of the invented apparatus is that cache memory and pre-processor units can be arranged in a versatile system configuration. The invention allows a multiplicity of cache memory and pre-processor units to access a common data line under the control of the host processor software.

A sixth novel feature of the present invention is that it provides efficient hardware pre-processing of floating point data so that a host processor can efficiently calculate mean, standard deviation or any values that require arithmetic manipulations.

BRIEF DESCRIPTION OF THE DRAWINGS

FIG. 3 is a table showing the binary counting sequence.

FIG. 4 is a block diagrammatic view showing the present invention in a versatile system configuration which allows a multiplicity of cache memory and pre-processor units to access the peripheral data bus and also allows each unit to be controllable by the host processor.

DETAILED DESCRIPTION OF THE PREFERRED EMBODIMENTS

Figure 1:
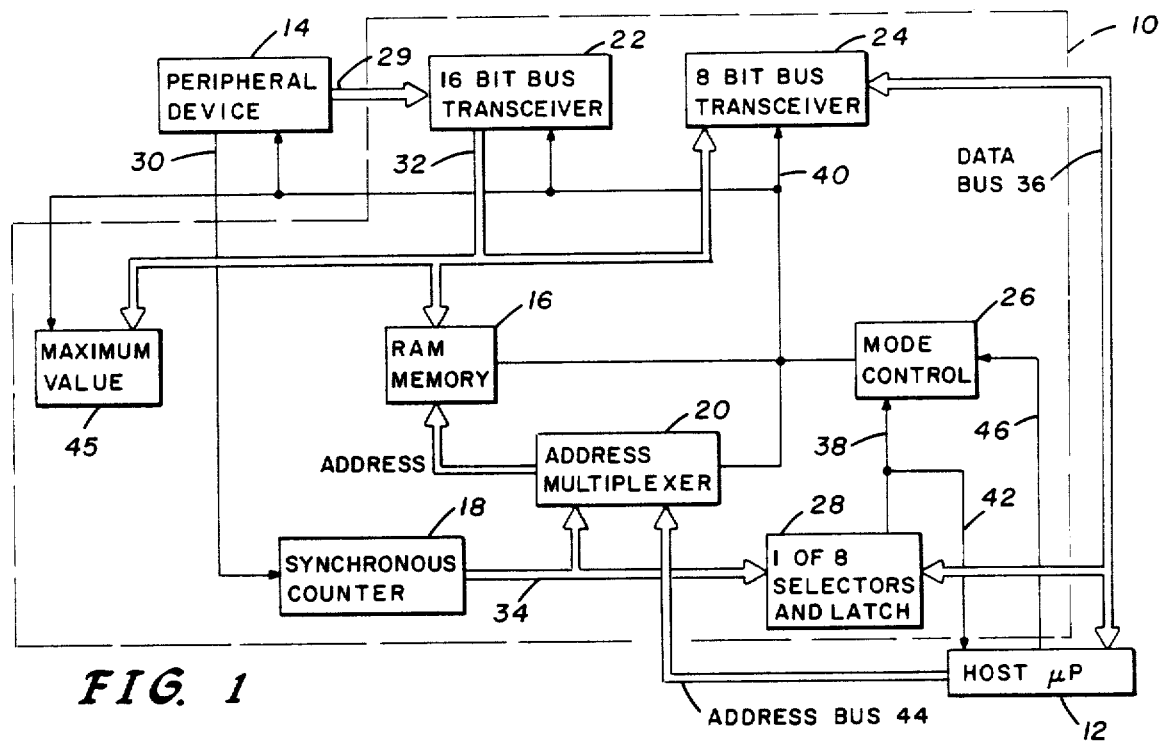
FIG. 1 is a block diagrammatic view of the invented cache memory and pre-processor.

FIG. 1 shows the invented Cache Memory and Pre-Processor 10 in block diagrammatic form. The Cache Memory and Pre-Processor 10 provides an interface between a memory mapped processor system 12 and a 16 bit parallel output peripheral 14. The peripheral 14 generates data in the form of a 16 bit digital word (12 bits of mantissa and 4 bits of exponent). Generally, the invented cache memory and pre-processor 10 is used in conjunction with a peripheral 14 having output which is not time continuous, and the regularity of the occurrence of new data is not known a priority. The invention is designed to handle a peripheral generating an average data rate in the $10^\circ$ sec$^{-1}$ tp $10^4$ sec$^{-1}$ range, with intermittent data bursts as high as $10^6$ sec$^{-1}$. The host processor 12 can be operating in an interrupt driven mode.

The cache memory aspect of the invention, as shown in FIG. 1, consists of: (1) A RAM memory 16 which, in the acquisition mode, is configured as a 2K byte by 16 bit block of memory and, in the retrieval mode, is configured as a 4K byte by 16 bit block of memory; (2) a synchronous counter 18; (3) an address multiplexer 20 which allows either synchronous counter 18 or the host processor 12 to address RAM memory 16; (4) two bus transceivers which allow either the peripheral 14 or the processor 12 to have access to the RAM memory 16 data bus; (5) a mode control 26, operably controlled by the host processor 12, for switching the bus transceivers 22, 24, the RAM memory 16, and the address multiplexer 20 to either the acquisition or retrieval mode; and (6) a 1 of 8 selector and latch 28 which is addressed by the host processor 12 and allows the sampling size of the cache memory to be adjusted under software control to between 16 to 2048 words.

In the data acquisition mode, the RAM memory 16 is directly connected to the peripheral device 14 through bus transceiver 22. The 16-bit parallel data bus 29 connects the peripheral device 14 to the invented cache memory. The synchronous counter 18 is triggered by the peripheral device 14 via control line 30, (e.g., peripheral data ready line) and generates the address for each 16-bit word of incoming data. The address for each 16-bit word passes through address multiplexer 20 to the RAM memory 16. Data inputs are therefore directed through the bus transceiver 22 and through a 16-bit parallel bus 32 to the RAM memory 16, while corresponding memory addressing are generating by the synchronous 12 bit counter 18. Data ready pulses passing from peripheral 14 along control line 30 are used to write the data into memory by incrementing the synchronous counter 18.

The output of synchronous counter 18 also travels along bus 34 to the 1 of 8 selector 28, which operates as a sample size control means. The 1 of 8 selector and latch 28 can be programmed via data bus 36 by the host processor 12 and will provide a control signal along line 38 when the synchronous counter output exceeds the value programmed in the 1 of 8 selector and latch. When control line 38 goes active, mode control 26 inhibits further data entry pulses via line 40. An interrupt signal 42 is generated and sent to the host processor 12. In this manner, the host processor 12, can adjust, under software control, the sampling size of the memory between 16 to 2048 16-bit data words.

Although the cache memory shown in FIG. 1 utilizes a 16-bit input bus and a RAM memory configured to accept 2K byte by 16 bit blocks of data, it is understood that any N bit data bus could be used and that the RAM memory could be configured to accept any M byte times N bit block of data.

As shown in FIG. 1, the invented cache memory and pre-processor also provides some pre-processing functions during the acquisition mode. At the same time the data are being acquired, a maximum value circuit 45 extracts the 4 bits of exponent from the 16-bit data word. It compares the exponent values and stores, in a uniquely addressed location, an image of the maximum encountered valued. The maximum value circuit 45 is composed of a register and a magnitude comparator (not shown in FIG. 1) configured such that each exponent is compared to the previously stored maximum value. When a new maximum value is detected, it replaces the old value in the register. Prior to a data acquisition session, the register is preset to 0.

In general the acquisition mode is entered under the control of the host processor 12. Once the mode is initiated, the host processor is free to handle other tasks until such time as an interrupt (line 42) is generated. In response to the interrupt, the host processor may switch the cache memory and pre-processor into the retrieval mode when it chooses to retrieve the stored data. As will be discussed later in this specification, two or more cache memory pre-processor units may operate in a ping-pong manner, with the host processor switching each cache memory and pre-processor unit into an appropriate operational mode.

In the retrieval mode, also shown in FIG. 1, the RAM memory 16 is configured as a 4K byte by 8-bit block of memory. The high and low bytes of the previously defined 16 bit words are interleaved. In other words, two successive bytes of memory constitute the 16 bits of memory for one unique data point. As will be seen in detail later (FIG. 2) this is done so that double-byte access commands can be used to retrieve data. Data are transferred from the RAM memory 16 through the 8 bit bus transceiver 24 and onto the host processor data bus 36. During the retrieval mode, the 16-bit bus transceiver 22 is switched by mode control 26 such that the RAM memory 16 is disconnected from the peripheral device 14. The host processor 12 then address as the RAM memory 16 using its address bus 44. During the retrieval mode, address multiplexer 20, disconnects the output from the synchronous counter 18 and connects the host processor address bus 44 to the RAM memory address.

Data bus 36 is a bidirectional data bus which allows the host processor to read data from the RAM memory 16 and/or to write over a particular memory address in RAM memory 16. From the point of view of the host processor, the cache memory appears to be its own dedicated memory unit. As will be discussed later, this feature can be used to increase the speed of certain type of data manipulations. In addition, the host processor can read the maximum value for the exponent from the maximum value circuit 45 as a right or left justified nibble.

After the data have been read, and calculations have been performed, the cache memory pre-processor can be initialized and returned into the acquisition mode by a command from the host processor along control line 46. Again, while in the acquisition mode the cache memory appears to be a 2K byte by 16-bit storage block dedicated to the peripheral 14; and, during the retrieval mode the cache memory appears to be a 4K byte by 8-bit storage block dedicated to the host processor.

Figure 2:
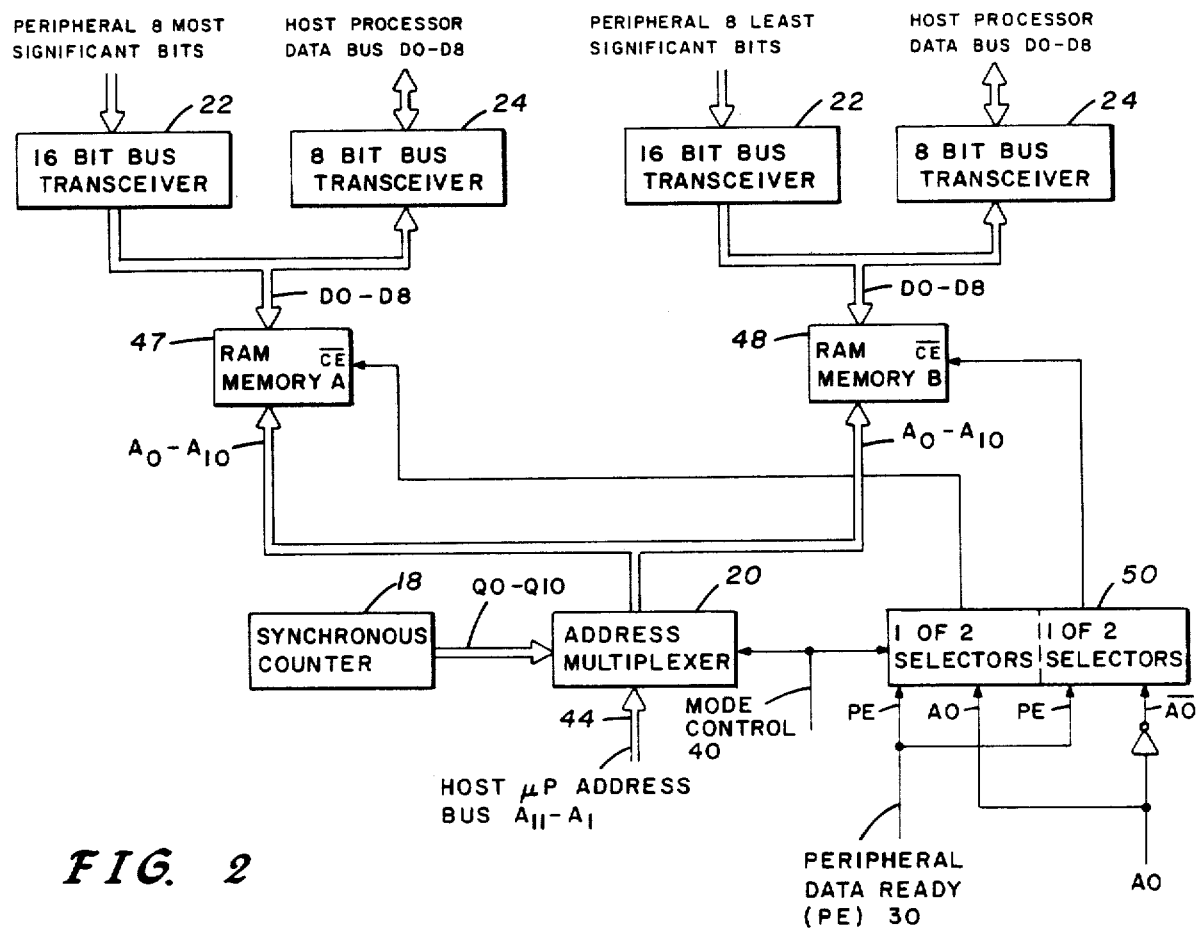
FIG. 2 is a block diagrammatic view of the cache memory which can be reconfigured from a 2K byte by 16-bit space during the acquisition mode to a 4K byte by 8-bit space during the retrieval mode, wherein the high and low bytes of the previously defined 16-bit words are interleaved.

An important feature of the present invention is the ability of the RAM memory 16 to be reconfigured from a 2K byte by 16-bit memory space during the acquisition mode to a 4K byte by 8 bit memory space during the retrieval mode. The high and low bytes of the previously defined 16-bit words are interleaved. In other words, two successive bits of memory constitute the 16 bits of memory for one unique data point. The RAM memory 16, as shown in FIG. 2, comprises a first 2K byte by 8 bit RAM memory 47, and a second 2K byte by 8-bit RAM memory 48.

In the acquisition mode, bits Q0 through Q10 from the synchronous counter 18 are coupled to address multiplexer 20 to address lines A0 through A10 of the first and second RAM memories (47, 48). The peripheral data ready line 30 passes through a selector means 50 and connects to the chip enable (CE) of the first and second RAM memories (47, 48). Each time the peripheral data ready line 30 goes active, both the first and second RAM memories (47, 48) will be enabled. Similarly, when the peripheral data ready line 30 goes active, a 16-bit data word will be available on the peripheral data bus. The 8 most significant bits will be inputted via bus transceiver 22 onto the first RAM memory 47 and the 8 least significant bits will be inputted via bus transceiver 22 onto the second RAM memory 48. Each RAM memory (47, 48) will store the 8 bit word components at the same memory address as generated by synchronous counter 18.

In the retrieval mode, mode control line 40 will: (1) cause the address multiplexer to switch such that the synchronous counter 18 is disconnected and the address bus 44 ($A_1$ through A11) of the host processor will be connected to address lines A0 through A10 of the first and second RAM memories (47, 48); (2) cause the bus transceiver 22 to be disengaged and bus transceiver 24 to be engaged so as to connect the data bus of each RAM (47, 48) to the data bus of the host processor; and, (3) cause the selector means 50 to connect address bit A0 of the host processor to the chip enable (CE) of the first RAM 47 and the inverse of the processor address bit A0 to the chip enable (CE) of the second RAM 48. It will be noted that during the acquisition mode the least significant bit of the synchronous counter 18 is hooked up to the least significant bit of the RAM address. However, in the retrieval mode, the least significant bit (A0) of the host processor address bus is not hooked up to the RAM address, but connects to the chip enable (CE) of each RAM memory. The next most significant bit (A1) of the host processor address bus is instead hooked up to the least most significant bit of the RAM memories (47, 48). Referring to the binary counting sequence shown in FIG. 3, it will be noted that the least significant bit (LSB) changes with every count, while the next least significant bit (NLSB) changes state on every other count. Therefore, by having address bits A1 through A11 connected to each RAM memory lines A0 through A10, and by having bit A0 of the processor address bus cause the chips to be alternatively enabled, the 8 bit processor data bus can retrieve the least significant 8 bits of the 16-bit word and then retrieve the most significant 8 bits of the 16-bit word or vice-versa depending upon typical processor operation.

In this manner the cache memory can be configured as a 2K byte by 16-bit memory space dedicated to the peripheral during the acquisition mode. During the retrieval mode the cache memory can be configured as a 4K byte by 8-bit memory space dedicated to the processor. The high and low bytes of the previously defined 16-bit words are interleaved. In other words, two successive bytes of memory constitute the 16 bits of memory for one unique data point. However, it will be recognized that this technique can be generalized and a plurality of separate RAM storage elements can be switched so that 32 bit words can be stored and retrieved by the processor during the retrieval mode in a 8-bit or 16-bit chunks. It will be noted by reference to the counting table of FIG. 3, that this is possible because just as the A1 bit repeats itself every other count, the A2 bit repeats itself every fourth count. The system can thus be generalized by applying the above principal and using known digital techniques to construct the selector means 50.

The invented cache memory and pre-processor can be used by the host processor in the efficient calculation of mean and standard deviation values. Data from the peripheral may be acquired by the invented cache memory and pre-processor in floating point notation having a mantissa and an exponent. For instance, for a 16-bit data word, the exponent may use 4 bits and the mantiss 12 bits. In the floating point notation, the mantissa is justified to maximize the number of significant bits in the mantissa and the exponent is adjusted appropriately. To calculate the mean value, the data must be first summed. Prior to summation, the data in floating point notation must be normalized. The maximum value circuit 45 assists by determining the maximum exponent as the data were acquired from the peipheral. Hardware calculation of the largest exponent value reduces the burden on the host processor's software. Once the maximum exponent value is known, the data can be normalized and then summed. For example, if the largest exponent value is 8, and a particular data word has an exponent value of 7, the data in the mantissa should be shifted to the right so that the exponent is the same. Also, since data bus 36 is bidirectional, the justified data word can be rewritten over the previously recorded data word. Again, this is because in the retrieval mode the RAM memory 16 appears to be part of the host processor's memory.

In operation, to calculate the means and standard deviations one would: (1) read the maximum exponent value from the maximum value circuit 45; (2) read each 16-bit data word (in 8-bit data sections, as discussed above); (3) normalize the data and sum the new justified data values; (4) rewrite the justified data in RAM memory 16 changing only those values which required normalization; (5) read the justified data out again; and, (6) calculate the standard duration. Using this method one need only read data in a loop twice and normalize the data once. By contrast, for prior art technique would have required one to read the data three times and normalize the data twice. Therefore, the present invention reduces the host processor's software burden and reduces calculation times.

As shown in FIG. 4, two or more cache memory and pre-processor units (52, 54) may access the peripheral data line 29 and the host processor data bus 36. As with the single unit embodiment shown in FIG. 1, each unit can operate in the acquisition or retrieval modes as controlled by the host processor. When a particular unit is in the acquisition mode, it appears to be dedicated memory of the peripheral, acquiring 16-bit data words. When a particular cache memory is "full" an interrupt command 46 alerts the host processor. The host processor may then place a second cache memory in the acquisition mode to gather the data flowing from the peripheral. In this manner two cache memory and pre-processor units can be assembled in a ping-pong embodiment where one unit alternatively acquires data while the other unit is in the retrieval mode where the processor is retrieving previously acquired data. This ping-pong configuration eliminates the possibility of lost data. While in the retrieval mode, the particular cache memory and preprocessing unit appears to be a dedicated memory allowing the retrieval of 8-bit data words. It will be understood that 3, 4, or more cache memory and pre-processor units can be arranged in this versatile system configuration. In the configuration employing more than two cache memory and pre-processor units, the host processor may elect to maintain one or more cache memory and pre-processor units in an idle mode. The net effect is that a maximum of one cache memory and pre-processor unit need be directed to the peripheral and a maximum of one can be directed to the host processor at any one time. It will also be understood that in the acquisition mode each cache memory and preprocessing unit can acquire (N×8) data words and in the retrieval mode the host processor can read (M×8) data selections.

Obviously many modifications and variations of the present invention are possible in light of the above teachings. It is therefore to be understood, that within the scope of the appended claims the invention may be practiced otherwise than the specifically described.

What is claimed and desired to be secured by letters patent of the United States, is:

1. An apparatus for interfacing between a peripheral device which outputs Q-bit data words and a host processor having an N bit data bus, wherein data are acquired from the peripheral device during an acquisition mode and retrieved from said interface apparatus during a retrieval mode, said apparatus comprising:
 a plurality of single port memories, each memory having a M byte by N bit memory space;
 a first bus transceiver means for connecting, during the acquisition mode, a different N bit portion of said Q bit data word to each of said plurality of memories;
 a second bus transceiver means for directly connecting, during the retrieval mode, the data lines of each of said plurality of memories to the host processor N bit data bus;
 a counter means for generating an incremental address each time the peripheral generates a new data word;
 an address multiplexing means, for connecting the address lines of each of said plurality of single port memories to said counter means during the acquisition mode, and for directly connecting the address lines of each of said plurality of single port memories to certain most significant bits of he host processor address bus during the retrieval mode; and,
 a selector means, operably connected to each of said plurality of single port memories, for alternatively enabling each of said plurality of single port memories in response to certain least significant bits of the host processors address bus during the retrieval mode.

2. The apparatus of claim 1, wherein said counter means increments each of said plurality of memories, during the acquisition mode, when the peripheral data ready line goes active.

3. The apparatus of claim 1, wherein said peripheral means provides floating point data words and wherein said apparatus further comprises a maximum value means, operably coupled to said first and second bus transceiver means, for comparing, during the acquisition mode exponent values appearing in each data word and storing the largest exponent value, and wherein said stored largest exponent value can be read by the host processor during the retrieval mode.

4. The apparatus of claim 1, further comprising a sample size control means, operably coupled to said counter means and programmed by the host processor, for monitoring the address generated by said counter means and for providing an interrupt command when a programmed sample size value is reached.

5. An apparatus for interfacing between a 16-bit peripheral device and an 8-bit host processor, comprising:
   a first single port memory configured as an M byte by 8-bit memory space;
   a second single port memory configured as an M byte by 8-bit memory space;
   a first transceiver means for connecting, during the acquisition mode, the least significant 8 bits of the peripheral output to the data lines of said first single port memory and the most significant 8 bits of the peripheral output to the data lines of said second single port memory;
   a second bus transceiver means for directly connecting, during the retrieval mode, the host processor data bus to data lines of said first and second single port memory;
   a counter means for generating an incremental address each time the peripheral generates a new data word;
   an address multiplexer means for connecting the address lines of said first and second single port memory to said address means during the acquisition modes, and for directly connecting the address lines of said first and second single port memory to all but the least significant bit of the host processor address bus during the retrieval mode; and,
   a selector means, operably connected to said first and second single port memory, for alternatively enabling said first or second single port memory in response to the least singnificant bit of the host processor address bus during the retrieval mode.

6. The apparatus of claim 5, wherein said counter means increments both said first and second single port memory, during the acquisition mode, when the peripheral data ready line goes active.

7. The apparatus of claim 5, further comprising a mode control means, operably connected to said address multiplexer, said selector means and said first and second bus transceiver means, for switching said address multiplexer means, said selector means, and said first and second bus transceiver means into the acquisition mode or the retrieval mode under control of the host processor.

8. the apparatus of claim 7, wherein said counter means is a synchronous counter which is triggered when the peripheral data ready goes active.

9. The apparatus of claim 6, further comprising a sample size control means, operably coupled to said counter means and programmed by the host processor, for monitoring the address generated by said counter means and for providing an interrupt command when a programmed sample size value is reached.

10. The apparatus of claim 5, wherein said peripheral provides 16-bit floating point data words, and wherein said apparatus furter comprises a maximum value means, operably coupled to said first and second bus transceiver means, for comparing, during the acquisition mode, exponent values appearing in each data word and storing the largest exponent value, and wherein said stored largest exponent value can be read by the host processor during the retrieval mode.

11. The apparatus of claim 5, wherein said first and second single port memory connect through said second bus transceiver to the host processor via a bidirectional data bus, thereby allowing the host processor to read or write data into said first or second single port memory.

12. The apparatus of claim 6, having a plurality of said first and second single port memories and wherein a plurality of mode control means control a plurality of address multiplexer means, selector means, and first and second bus transceiver means, so as to provide a versatile system configuration, allowing each of said plurality of first and second single port memories to be accessed by the peripheral and host processor data buses and to be operably controlled by said host processor.

13. The method of interfacing with a peripheral so as to efficiently calculate mean and standard deviation values, comprising the steps of:
   configuring a single port memory space to acquire M bit words;
   reading data from a peripheral to said memory space while a counter means triggered by the peripheral generates an address for each data word;
   comparing exponent values appearing in each data word and recording the largest;
   disconnecting the peripheral from said single port memory space;
   reconfiguring said single port memory space to deliver N bit words;
   retrieve data from said single port memory space in N bit words under direct control of the processor address line;
   retrieve the largest exponent value;
   normalize the data words to a common exponent value;
   calculate the mean value; rewrite normalized data words into said single port memory space;
   retrieve normalized data words from said single port memory space; and,
   calculate standard deviation values.

* * * * *